Oct. 31, 1961  P. BAUMGARTNER ET AL  3,006,732
CHLORINE PRODUCTION
Filed Jan. 6, 1959  2 Sheets-Sheet 1

INVENTORS
PIERRE BAUMGARTNER
PIERRE BEDAGUE
JEAN CLAUDE BALACEANU
BY *Toulmin & Toulmin*
ATTORNEYS

INVENTORS
PIERRE BAUMGARTNER
PIERRE BEDAGUE
JEAN CLAUDE BALACEANU

BY Toulmin & Toulmin

ATTORNEYS

3,006,732
CHLORINE PRODUCTION

Pierre Baumgartner, Asnieres, Pierre Bedague, Roquetoire, and Jean Claude Balaceanu, Paris, France, assignors to Institut Francais du Petrole des Carburants et Lubrifiants, Paris, France
Filed Jan. 6, 1959, Ser. No. 785,288
Claims priority, application France Jan. 9, 1958
8 Claims. (Cl. 23—219)

This invention relates to improvements in the production of chlorine and more particularly in the process of producing chlorine by catalytic oxidation of hydrogen chloride.

The oxidation of hydrogen chloride with oxygen or an oxygen-containing gas such as, for instance, air, is carried out usually by heterogeneous catalysis in the vapor phase at a temperature in the vicinity of 400° C.

Among the numerous mineral substances that may be used as catalysts in this reaction which may be formulated by the equation:

(1) $$4HCl + O_2 \underset{catalyst}{\overset{\longleftarrow}{\longrightarrow}} 2H_2O + 2Cl_2$$

there are particularly the chlorides and oxides of multivalent metals which have proved effective. Among these metal chlorides and oxides, those of iron, copper, manganese and especially chromic oxide, $Cr_2O_3$, have been found very useful.

All these known catalysts suffer from the drawback of becoming rapidly deactivated, whereby a continuous industrial operation of the process is made virtually impossible. For, after a certain number of hours of operation, the conversion rate for a determined amount of catalyst decreases so considerably that the entire process becomes uneconomical.

Various methods have been proposed in the past in order to impede the deactivation of metallic chloride catalysts, where that deactivation is due to the volatility or thermic instability of the catalysts.

For instance, the reaction mixture to be conducted past the catalyst has been fed into a reaction zone containing the catalyst alternatingly from opposite ends of the zone, so that the entrainment and losses of the active catalyst in vapor form in the reaction mixture are limited.

Such methods are, however, not easy to realize, especially in continuous operation, and are, moreover, of little or no effect in trying to maintain the activity of oxidic catalysts, and in particular of chromic oxide.

Another known method of reactivating deactivated chromic oxide catalyst, which method is described, for instance, in the British Patent 584,790, is concerned with the regeneration of chromic oxide by treating the same with oxygen or air, but this method requires a discontinuous feeding of hydrogen chloride, and thus makes a continuous operation impossible. In such a case the hydrogen chloride feed must be interrupted at regular intervals to permit air or oxygen to circulate over the catalyst. Furthermore the reactivation thus achieved provides a new efficiency to the catalyst for only a few more minutes.

It is, therefore, an object of our invention to provide a process for a truly continuous catalytic production of chlorine by oxidation of hydrogen chloride in the presence of chromic oxide as the oxidation catalyst.

It is another object of our invention to provide a process for a continuous catalytic production of chlorine by oxidation of hydrogen chloride in the presence of a chromic oxide catalyst, wherein the conversion rate remains stable over very long periods with limited amounts of catalyst, due to the fact that the activity of the catalyst is preserved in a simple manner.

These objects are attained and the drawbacks of the known methods avoided in the process according to the invention, wherein the high initial conversion rate achieved with a fresh catalyst material is maintained by carrying out the catalytic reaction of hydrogen chloride and oxygen in contact with the chromic oxide catalyst in the presence of a small, but constant amount of chromium oxychloride, $CrO_2Cl_2$, vapors of the later substance being introduced in mixture with the gaseous reactants.

We have, indeed, discovered that the steps of circulating with the reactant mixture a small, but constant amount of chromium oxychloride over the chromium oxide catalyst, leads to a very considerable improvement in the lifetime of the catalytic activity of $Cr_2O_3$ when used in the catalytic oxidation of hydrogen chloride.

While no completely satisfactory explanation for this effect of $CrO_2Cl_2$ can be given, it may be that during the reaction of hydrogen chloride and oxygen over chromic oxide catalyst and the resulting formation of chlorine, a small portion of the chromic oxide is converted to chromium oxychloride according to the equation:

(2) $$Cr_2O_3 + 4HCl + \tfrac{3}{2}O_2 \rightarrow 2CrO_2Cl_2 + 2H_2O$$

and that it is just the very catalytically active centers of chromium atoms in the surface of the catalyst which are thus converted. The formed chromium oxychloride is then increasingly vaporized at the temperature range in which the catalytic reaction is carried out. In fact, the boiling point of $CrO_2Cl_2$ is 117° C. The active centers of the chromic oxide catalyst are thus increasingly distilled off and entrained in the reactant flow, until the remaining chromic oxide is practically completely deactivated, although this deactivated chromic oxide represents by far the larger portion of the initial catalyst.

The continuous circulation of chromium oxychloride can be advantageously effected by introducing the vaporized $CrO_2Cl_2$ into the continuous stream of the gaseous mixture of hydrogen chloride and oxygen. The chromium oxychloride which is entrained in the gaseous reaction end products and leaves the exit of the reaction zone, is retained in the water formed during the catalytic reaction (1) supra, as well as the unreacted residual HCl. These gaseous products are separated from the water in a suitable manner, for instance by a treatment with sulfuric acid, and the gaseous hydrogen chloride and chromium oxychloride vapors are recycled in the process.

In the aqueous phase the following equilibrium exists (3) $$CrO_2Cl_2 + H_2O \rightleftharpoons CrO_3 + 2HCl$$

and with the excess of hydrogen chloride present, addition of concentrated sulfuric acid binding the water in the above equilibrium leads to the expulsion of $CrO_2Cl_2$ vapors and HCl from the aqueous solution.

The accompanying flowsheet illustrates this recycling process.

The rate of flow of chromium oxychloride must be adjusted in a suitable manner to the rate of flow of the reactant gas mixture, so that at all times there prevails in the reactor a partial pressure of $CrO_2Cl_2$ which is sufficient to have the desired effect of prolonging the lifetime of the active catalyst in the chromic oxide.

Expressed in proportion to the rate of flow of hydrogen chloride, the rate of flow of chromium oxychloride is so chosen that the molar ratio of $[CrO_2Cl_2]:[HCl]$ ranges from 1:10,000 to 1:10, and preferably from 1:10,000 to 1:1,000. If the flow rate of hydrogen chloride is 1,000 liters per hour, the flow rate of chromium oxychloride would correspondingly amount to approximately 0.7 to 70 grams per hour, and preferably between 0.7 and 7 grams per hour.

A smaller rate of chromium oxychloride would have too weak an influence to maintain the activity of the chromic oxide catalyst satisfactorily, while an excess of chromium oxychloride may lead to increasing difficulties of recovery and recycling, and unduly great losses of chromium oxychloride which would not be compensated by a corresponding effect on preserving the catalyst, so that the entire process would become less economical. However, when recycling of $CrO_2Cl_2$ is carried out in a very effective manner the flow rate of the latter may without any inconvenience be chosen higher than that corresponding to a molar ratio of chromium oxychloride to hydrogen chloride of 1:10 and even higher than 1.

The optimum flow rate of chromium oxychloride depends on the amount of catalyst present in the reactor as well as on the manner in which the catalyst is used, i.e. with or without support, in a fixed or a mobile catalyst bed etc. The above-mentioned figures should, therefore, not necessarily be considered as limitative.

In each individual case, it will be easy to determine the minimum flow ratio of the chromium oxychloride to the reactant mixture, whereby the activity of the chromic oxide catalyst can be satisfactorily maintained.

The continued stability of the catalyst becomes noticeable by the fact that the initial conversion rate of the catalytic reaction is maintained over a long time, whereby it is possible to attain in the process according to the invention a mean conversion rate during that prolonged period of substantially constant catalyst activity, which rate is far superior to the mean conversion rate which is attainable with the same amount of catalyst over the same period, as used in the hitherto known processes.

The process according to the invention can be applied to the various forms of chromic oxide, used either pure or on a suitable conventional support such as, for instance, alumina, pumice or silica gel, in a fixed bed or a mobile, fluid one. Particularly satisfactory results are obtained when using as catalyst material, amorphous forms of chromic oxide which are prepared at low temperature, i.e. below 500° C. and preferably in the range of 350°–400° C. These amorphous modifications of $Cr_2O_3$ show particularly great catalytic activities. They can be produced, for instance, by calcination of ammonium bichromate below 400° C. or by calcination of chromic acid at the same temperature range below 400° C. and a subsequent reduction of the resulting chromium trioxide with hydrogen.

According to another feature of the invention, it is possible to regenerate the activity of chromic oxide which has already lost part of its catalytic activity, so as to restore the latter to almost its initial value over a much longer period of time than this was possible by any known method. Thus, a chromic oxide which has lost about 50% of its initial activity can be reactivated to show about 87% of its initial activity, by using it for some time as catalyst in the catalytic oxidation reaction between hydrogen chloride and oxygen in the presence of chromium oxychloride vapors in the stream of the gaseous reactants mixture.

The use of an admixture of chromium oxychloride vapors to the gaseous stream of reactants does not have any appreciable effect on the optimum ratio between the amount of hydrogen chloride and that of oxygen such as results from the known studies of the catalytic oxidation of hydrogen chloride.

While it has been found in the art that a noticeable excess of oxygen over the stoichiometrically required amount thereof is advantageous, the use of stoichiometrical amounts of oxygen and hydrogen chloride in the mixture of the reactants, and even a deficit of oxygen in that mixture will still lead to quite satisfactory yields of chlorine. It is also possible to work with an inert diluent of the reactant gases, such as nitrogen, for instance by replacing the oxygen in the mixture by correspondingly larger amounts of air.

The advantages due to the use of a partial pressure of chromium oxychloride are attained independent of the ratio of $O_2$:HCl in the reactant mixture, and such use is, therefore, not limited to any particular ratio of these reactants to each other or to an eventual diluent.

In the accompanying drawings which help to better explain the invention,

Figure 1:
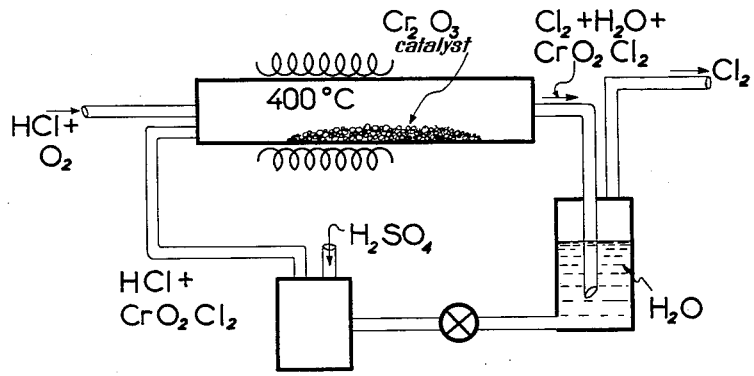
FIGURE 1 is the flow sheet referred to above.

The invention will now be further illustrated by a number of examples which are, however, not meant to be limitative in any way of the scope of the invention.

EXAMPLE I

For the sake of comparison, an equimolecular mixture of gaseous hydrogen chloride and oxygen is caused to circulate, at a flow rate of 6 liters per hour, over 10 grams of an unsupported catalyst of pure chromic oxide prepared by the calcination of ammonium bichromate at a temperature of about 360° C. and placed in a reactor tube. The temperature in the zone of the latter containing the catalyst is maintained at 420° C.

At the beginning of the reaction, the conversion rate of hydrogen chloride to chlorine attains 92% by weight, while after 185 hours, that rate has dropped to 46%, which indicates that the catalyst has lost about 50% of its initial activity.

EXAMPLE II

Example I is repeated, but in the flow of the reactant gas mixture there is maintained a stream of chromium oxychloride at a rate of 50 milligrams per hour.

After 185 hours the initial conversion rate of 92% mentioned in Example I has not yet decreased, and the catalyst shows the same unchanged activity even after 300 hours of continuous operation.

EXAMPLES III TO V

Example I is repeated, but in the presence of 300 grams of the same catalyst and with an admixture of chromium oxychloride at a flow rate of 0.2 gram per hour.

The reaction temperature and the flow rates of hydrogen chloride and oxygen are varied as indicated in the table below:

Table I

| Example | Reaction Temperature | HCl flow rate (liters/hour) | $O_2$ flow rate (liters/hour) | Conversion rate, percent by weight | $Cl_2$ produced, g./hour |
|---|---|---|---|---|---|
| III | 380 | 30 | 30 | 94 | 45 |
| IV | 400 | 60 | 60 | 92 | 85 |
| V | 420 | 150 | 150 | 89 | 187 |

The activity of the 300 grams of chromic oxide catalyst used remains unchanged during 100 hours of continuous operation.

EXAMPLE VI

An alumina-supported chromic oxide catalyst containing 10% by weight of uncalcined $Cr_2O_3$ is prepared as described in the British Patent 676,667 to Diamond Alkali Company, Cleveland, Ohio, from 13 grams of chromium trioxide dissolved in 30 ccs. of water to which 90 grams of porous alumina having a grain size of 3 to 4 millimeters have been added.

The $CrO_3$ impregnated alumina grains are dried during 15 hours at 110° C. and then heated to 180° C. and treated in a hydrogen stream for 4 hours.

74 grams of the resulting catalyst are charged in a reactor tube and the catalyst charged zone of the latter is maintained at a temperature of 400° C., while a gaseous mixture of hydrogen chloride and oxygen is continuously passed over the catalyst at flow rates of 6 liters/hour for each of the two reactants.

After 50 hours of operation the initial conversion rate of 88% has dropped to 77%.

The results of a series of control tests after 20, 30, 50, 60 and 100 hours of operation are tabulated below giving the conversion rate of hydrogen chloride in absolute weight on the one hand, and in percentage of the initial conversion rate, on the other hand:

Table II

| Time of operation (hours) | | 0 | 20 | 30 | 50 | 60 | 100 |
|---|---|---|---|---|---|---|---|
| Conversion rate | absolute value | 88 | 85 | 83 | 77 | 74 | 59 |
| | percentage of initial rate | 100 | 97 | 94 | 87.5 | 84 | 67 |

These results demonstrate clearly the rapid deactivation of the catalyst when the operation is carried out in a conventional manner, i.e. without providing for the presence of a partial pressure of chromium oxychloride.

EXAMPLE VII

Example VI is repeated, but according to the invention, chromium oxychloride is admixed to the reactants mixture at a constant flow rate of 20 milligrams per hour.

The conversion rate of HCl to $Cl_2$ which is 88% at the beginning of the operation, is still unchanged after 100 hours of continuous operation.

Figure 2:
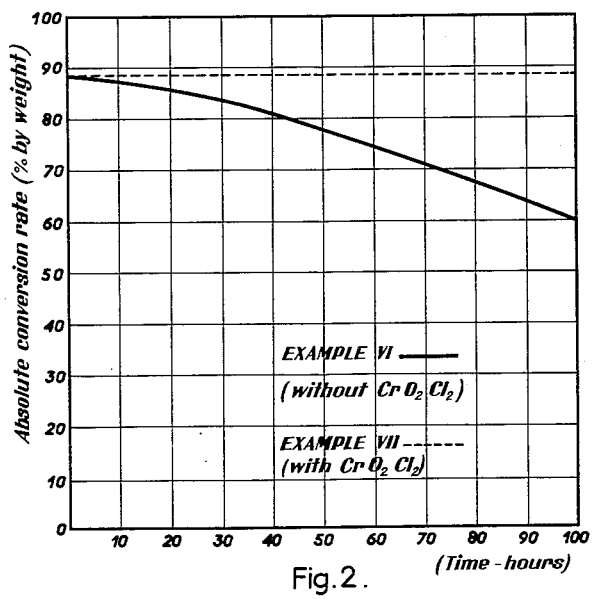
FIGURE 2 is a comparative graph illustrative of Examples VI and VII given hereinafter.

FIGURE 2 of the accompanying drawings shows the conversion rates obtained as described in Example VI with a conventional chromic oxide catalyst which are compared with those obtained when carrying out the catalysis according to the invention as described in Example VII.

As can be seen from the curves of FIGURE 2, in the latter case, the initial absolute conversion rate of 88% is preserved at this value after 20, 50, 60 and 100 hours of operation. These results compared with those of the table given in Example VI show clearly that the deactivation of the catalyst is practically negligible when the reaction is carried out in the presence of a stream of chromium oxychloride.

EXAMPLE VIII

In an apparatus as conventionally used for fluid catalysis, which comprises a vertically disposed reactor tube, a current of a gaseous hydrogen chloride-oxygen mixture is fed through the bottom end of the tube.

The gaseous mixture contains equimolecular amounts of the two reactants. A pulverulent chromic oxide catalyst obtained as described in Example I is disposed on a porous disc of glass frit.

The rate of flow of the reactants is so regulated that the fine particles of catalyst are maintained in a fluid state suspended in the stream above the glass frit disc in the reaction zone of the vertical tube, as is conventional in fluid catalysis.

Chlorine formed is obtained at the upper end of the tube. The activity of the catalyst is maintained practically constant over a time of at least 300 hours, by introducing into the reactants mixture a stream of chromium oxychloride at the rate given in Example II.

EXAMPLE IX 3.7 grams of a chromic oxide catalyst prepared as described in Example I and pressed into pellets are charged in a reactor and a mixture of hydrogen chloride and oxygen in which each component has a flow rate of 4 liters per hour is caused to circulate over the catalyst, while the temperature in the reactor is maintained at about 400° C. The absolute and the relative conversion rates are tabulated below:

Table III

| Time (hours) | | 0 | 20 | 40 | 60 | 80 | 100 | 120 |
|---|---|---|---|---|---|---|---|---|
| Conversion rate | Absolute value | 75 | 47.5 | 27 | 17 | 14.5 | 13 | 13 |
| | percentage of initial rate | 100 | 63 | 36 | 22.5 | 19.3 | 17.4 | 17.4 |

These results demonstrate clearly the rapid deactivation of chromic oxide in the absence of a partial pressure of chromium oxychloride in the reactant gas stream.

EXAMPLE X

Example IX is repeated, however, to the mixture of reactant gases, there is admixed a stream of chromium oxychloride at a flow rate of 20 mg. per hour. The results of determining the absolute and relative conversion rates of hydrogen chloride to chlorine are tabulated below:

Table IV

| Time (hours) | | 0 | 20 | 40 | 60 | 80 | 100 | 120 |
|---|---|---|---|---|---|---|---|---|
| Conversion rate | Absolute value | 75 | 75 | 75 | 74.5 | 74.5 | 74 | 74 |
| | percentage of initial rate | 100 | 100 | 100 | 99.3 | 99.3 | 98.7 | 98.7 |

Figure 3:
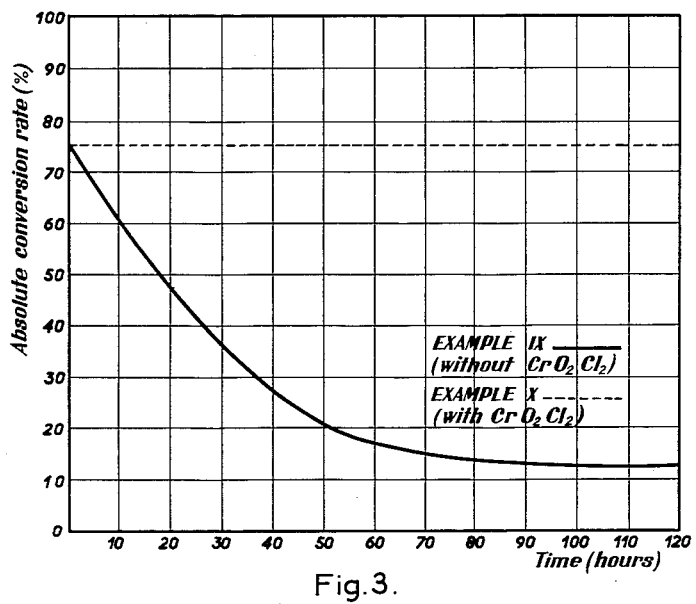
FIGURE 3 is a comparative graph illustrating Examples IX and X given below.

The results of Tables III and IV are graphically illustrated for better comparison in FIGURE 3 of the drawings.

The results obtained by using a partial pressure of chromium oxychloride in accordance with the invention as described in Example X clearly demonstrate the superiority of the new process over the known methods such as illustrated by the curve corresponding to Example IX.

In the case of Example X the deactivation of chromic oxide is practically negligible over the tested period of 120 hours.

Figure 4:
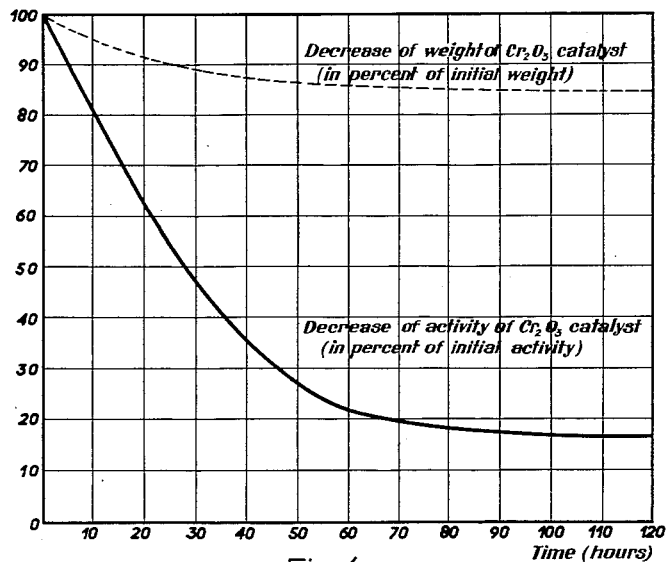
FIGURE 4 is a diagram illustrating the changes in the initial weight and initial activity of a known chromic oxide catalyst when used in a conventional catalytic reaction between hydrogen chloride and oxygen.

FIGURE 4 illustrates the relationship between the weight and the catalytic acivity of a chromic oxide mass used as a catalyst in the conversion of hydrogen chloride to chlorine by catalytic oxidation. It will be seen from the dashed curve that the decrease of weight of the catalyst during about 120 hours of operation is less than 15%. The activity of the catalyst, however, decreases over the same period by more than 80%. This indicates that the catalytic activity of chromic oxide seems to be connected with the presence of certain activity centers, which are at the same time more easily converted into chromium oxychloride and removed from the chromic oxide mass than the relatively inactive remaining 85% of the chromium oxide.

It will be understood that this invention is susceptible to further modification and, accordingly, it is desired to comprehend such modifications within this invention as may fall within the scope of the appended claims.

What is claimed is:

1. In a continuous process for the production of chlorine by catalytic oxidation of hydrogen chloride with an oxygen-containing gas, in the presence of a $Cr_2O_3$ catalyst, at a temperature lower than that at which $CrO_2Cl_2$ is decomposed to a chromium oxide consisting essentially of $Cr_2O_3$ the improvement of admixing chromium oxychloride vapors at a molar ratio to the rate of hydrogen chloride of more than 1:10,000 to the flow of gaseous reactants over said chromic oxide catalyst, thereby maintaining the activity of the catalyst at substantially the initial activity thereof over a prolonged period.

2. In a continuous process for the production of chlorine by catalytic oxidation of hydrogen chloride with an oxygen-containing gas, in the presence of a $Cr_2O_3$ catalyst, the improvement of admixing at a temperature lower than that at which $CrO_2Cl_2$ is decomposed to a chromium oxide consisting essentially of $Cr_2O_3$ chromium oxychloride vapors at a molar ratio to the rate of hydrogen chloride ranging from 1:10,000 to 1:10, to the flow of gaseous reactants over said chromic oxide catalyst, thereby maintaining the activity of the catalyst at substantially the initial activity thereof over a prolonged period.

3. In a continuous process for the production of chlorine by catalytic oxidation of hydrogen chloride with an oxygen-containing gas, in the presence of $Cr_2O_3$ catalyst, the improvement of admixing chromium oxychloride vapors at a temperature lower than that at which $CrO_2Cl_2$ is decomposed to a chromium oxide consisting essentially of $Cr_2O_3$, and at a molar ratio to the rate of hydrogen chloride ranging from 1:10,000 to 1:1,000, to the flow of gaseous reactants over said $Cr_2O_3$ catalyst, thereby maintaining the activity of the catalyst at substantially the initial activity thereof over a prolonged period.

4. In a continuous process for the production of chlorine by catalytic oxidation of hydrogen chloride, the improvement comprising the steps of charging a reaction zone with a conventional $Cr_2O_3$ catalyst having a determined initial catalytic activity; and circulating continuously a gaseous mixture of hydrogen chloride and oxygen in conventional molar ratio to each other and at conventional flow rate over said catalyst through said reaction zone and circulating together with said mixture at a temperature lower than that at which $CrO_2Cl_2$ is decomposed to a chromium oxide consisting essentially of $Cr_2O_3$, a stream of chromium oxychloride at a ratio to that of the hydrogen chloride in said mixture higher than 1:10,000, thereby maintaining the activity of said catalyst substantially at the initial one over from 100 to 300 hours and longer.

5. In a continuous process for the production of chlorine by catalytic oxidation of hydrogen chloride with an oxygen-containing gas in the presence of a $Cr_2O_3$ catalyst, at a temperature within the range of about 380° C. to about 420° C., the improvement of admixing, chromium oxychloride vapors at a molar ratio to the rate of hydrogen chloride of more than 1:10,000, to the flow of the gaseous reactants over said $Cr_2O_3$ catalyst, thereby maintaining the activity of the catalyst at substantially the initial activity thereof over a prolonged period.

6. In a continuous process for the production of chlorine by catalytic oxidation of hydrogen chloride with an oxygen-containing gas in the presence of a $Cr_2O_3$ catalyst containing a substantial proportion of amorphous modifications of the latter, at a temperature lower than that at which chromium oxychloride is decomposed to a chromium oxide consisting essentially of $Cr_2O_3$, the improvement of admixing chromium oxychloride vapors at a molar ratio to the rate of hydrogen chloride of more than 1:10,000, to the flow of gaseous reactants over said catalyst, thereby maintaining the activity of the catalyst substantially at the initial activity thereof over a prolonged period.

7. A method of improving the lifetime of the catalytic activity of $Cr_2O_3$ in a continuous catalytic process for the production of chlorine by oxidation of hydrogen chloride with an oxygen-containing gas at a temperature within the range of about 380° C. to about 420° C., which comprises the step of admixing, chromium oxychloride vapors at a molar ratio to the rate of hydrogen chloride of more than 1:10,000, to the flow of gaseous reactants over said catalyst.

8. In a continuous process for the production of chlorine by catalytic oxidation of hydrogen chloride with an oxygen-containing gas, in the presence of pure $Cr_2O_3$ prepared by calcinating ammonium bichromate at a temperature of about 360° C. and placed in a tubular reactor fed with a gaseous mixture of hydrogen chloride and oxygen at a flow rate of each of said gaseous reactants of 0.2 to 2 liters per hour and per gram of $Cr_2O_3$, said mixture being continuously circulated at a temperature in the range of 380° C. to 420° C., through said tubular reactor, the improvement of admixing chromium oxychloride vapors at a flow rate of 0.00067 gram per hour and per gram of $Cr_2O_3$, to the flow of said gaseous mixture over said $Cr_2O_3$, thereby maintaining the activity of said $Cr_2O_3$ substantially unchanged during 100 hours.

References Cited in the file of this patent

UNITED STATES PATENTS 2,592,598    Perrin _____ Aug. 15, 1952